US012809027B2

(12) United States Patent
Hammes

(10) Patent No.: US 12,809,027 B2
(45) Date of Patent: Nov. 24, 2026

(54) SAFE OBJECT TRACKING OF AN OBJECT

(71) Applicant: SICK AG, Waldkirch (DE)

(72) Inventor: Markus Hammes, Waldkirch (DE)

(73) Assignee: SICK AG, Waldkirch (DE)

( * ) Notice: Subject to any disclaimer, the term of this patent is extended or adjusted under 35 U.S.C. 154(b) by 340 days.

(21) Appl. No.: 18/587,338

(22) Filed: Feb. 26, 2024

(65) Prior Publication Data

US 2024/0310521 A1 Sep. 19, 2024

(30) Foreign Application Priority Data

Mar. 15, 2023 (EP) .................................... 23162021

(51) Int. Cl.
*G08G 1/04* (2006.01)
*G01S 13/56* (2006.01)
(Continued)

(52) U.S. Cl.
CPC .............. *G01S 17/66* (2013.01); *G01S 13/56* (2013.01); *G01S 17/894* (2020.01); *G05B 19/406* (2013.01); *G05B 2219/50193* (2013.01)

(58) Field of Classification Search
CPC ........ G05B 19/406; G05B 2219/50193; G05B 2219/40202; G05B 9/02; G01V 8/12; G01V 8/20; G01V 8/00; G01V 8/18; G01S 17/04; G01S 17/42; G01S 17/66; G01S 17/88; G01S 17/894; G01S 17/87; G01S 11/12; G01S 11/14; G01S 13/86; G01S 13/862; G01S 13/886; G01S 15/66; G01S 15/86;
(Continued)

(56) References Cited

U.S. PATENT DOCUMENTS 5,793,491 A * 8/1998 Wangler .................. G01S 17/89 356/613
2011/0095170 A1* 4/2011 Erb ......................... G01S 17/87 250/214 R
(Continued)

FOREIGN PATENT DOCUMENTS

EP 1300691 A2 4/2003
EP 1835306 A1 9/2007
(Continued)

OTHER PUBLICATIONS

European Search Report dated Aug. 24, 2023 corresponding to application No. 23162021.2.

*Primary Examiner* — Dionne Pendleton
(74) *Attorney, Agent, or Firm* — Nath, Goldberg & Meyer; Jerald L. Meyer

(57) ABSTRACT

A monitoring device for a safe object tracking of an object in a monitored zone having at least a first safe optoelectronic sensor and a safety controller connected to the first optoelectronic sensor, wherein the first optoelectronic sensor monitors a first protected field and a second protected field for object intrusions and outputs a corresponding safe signal at a first or second safe output and the safety controller evaluates the safe output signals. In this respect, the first protected field has a plurality of first partial protected fields and the second protected field has a plurality of second partial protected fields and the first partial protected fields and the second partial protected fields are arranged alternatingly following one another are along a line.

25 Claims, 6 Drawing Sheets

Figure 1:
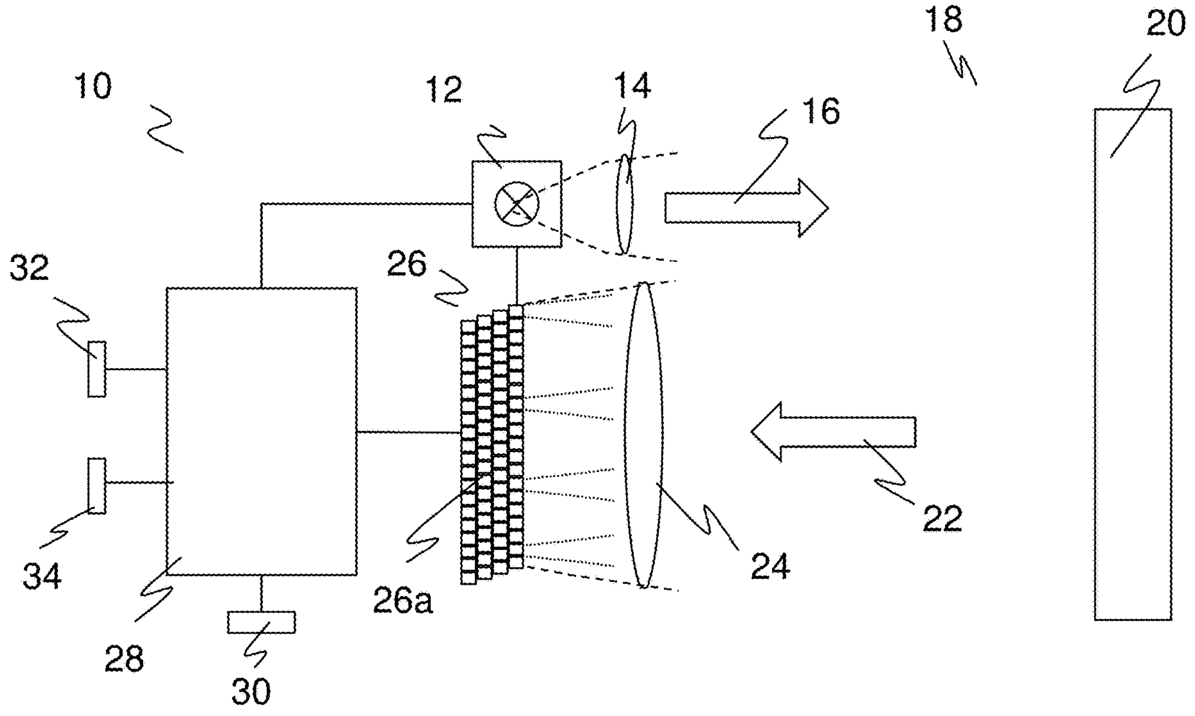

(51) Int. Cl.
*G01S 17/66* (2006.01)
*G01S 17/894* (2020.01)
*G05B 19/406* (2006.01)

(58) Field of Classification Search
CPC .......... G01S 15/88; G01S 17/89; G01S 19/13; G01S 7/415; G01S 7/4802; G01S 7/4808; G01S 17/86; G01S 17/58; G01S 17/931; G01S 7/003; G01S 7/4812; G01S 7/4813; G01S 7/4817; G01S 7/51; G01S 17/08; G01S 17/10; G01S 17/46; G01S 17/48; G01S 19/14; G01S 7/417; G01S 7/4816; G01S 7/483; G01S 7/4863; G01S 7/4972; F16P 3/142; F16P 3/144; A61B 2560/0223; A61B 2562/0204; A61B 2562/0214; A61B 2562/0219; A61B 2562/0223; A61B 5/0077; A61B 5/02; A61B 5/02444; A61B 5/0507; A61B 5/0522; A61B 5/0816; A61B 5/1102; A61B 5/1113; A61B 5/1114; A61B 5/113; A61B 7/04; A61B 8/00; B25J 9/1666; B25J 9/1674; B25J 9/1676; B25J 9/1697; G06T 17/05; G06T 17/10; G06T 2207/10028; G06T 7/593; G06T 2207/10012; G06T 2207/10024; G06T 2207/30232; G06T 2200/04; G06T 7/55; G06T 7/85; G06T 2207/20081; G06T 3/4038; G06T 7/194; G06T 7/70; G06T 7/73; G06T 17/00; G06T 19/003; G06T 2200/28; G06T 2207/10021; G06T 2207/20016; G06T 2207/20221; G06T 2207/30204; G06T 2207/30242; G06T 3/40; G06T 7/0002; G06T 7/001; G06T 7/10; G06T 7/187; G06T 7/521; G06T 7/60; G06T 7/90; G06T 7/97; G06T 15/60; G06T 17/20; G06T 2200/08; G06T 2207/20084; G06T 2207/20228; G06T 2207/30108; G06T 2207/30196; G06T 2207/30244; G06T 7/0004; G06T 7/11; G06T 7/13; G06T 7/136; G06T 7/246; G06T 7/277; G06T 7/292; G06T 7/30; G06T 7/344; G06T 7/50; G06T 7/579; G06T 7/80; G08B 21/043; G08B 21/0492; G08B 13/181; G08B 13/19613; G08B 13/19628; G08B 13/19645; G08B 13/19693; G08B 13/19697; Y10S 901/47; Y10S 901/49; H04N 23/90; H04N 13/239; H04N 2013/0081; H04N 13/243; H04N 13/271; H04N 13/246; H04N 23/57; H04N 23/60; H04N 23/698; H04N 13/156; H04N 13/282; H04N 23/56; H04N 23/662; H04N 23/69; H04N 13/128; H04N 13/133; H04N 13/204; H04N 13/221; H04N 13/25; H04N 13/254; H04N 13/261; H04N 17/002; H04N 2013/0092; H04N 23/45; H04N 23/51; H04N 23/55; H04N 23/58; H04N 23/63; H04N 23/635; H04N 23/651; H04N 23/695; H04N 5/04; H04N 5/144; H04N 7/181; G06V 10/16; G06V 20/64; G06V 10/82; G06V 20/52; G06V 20/58; G06V 10/147; G06V 10/25; G06V 10/255; G06V 10/762; G06V 10/10; G06V 10/141; G06V 10/145; G06V 10/751; G06V 10/774; G06V 10/803; G06V 10/809; G06V 20/10; G06V 20/647; G06V 2201/06; G06V 2201/12; G06V 30/2504; G06V 40/10; G01C 11/02; G01C 11/04; G01C 15/002; G01C 15/006; G01C 21/1652; G01C 21/32; G01C 25/005; G01B 11/2504; G01B 11/02; G01B 11/24; G01B 11/26; G01N 2021/845; G01N 2021/8883; G01N 2021/8887; G01N 21/8851; G06K 7/1413; G06K 7/10861; G06Q 30/0623; G06N 3/045; G06N 3/008; G06N 3/0464; G06N 3/08; G05D 1/0227; G05D 1/0253; G05D 1/0274; H10W 90/00; G06F 18/251

See application file for complete search history.

(56) References Cited

U.S. PATENT DOCUMENTS

| | | | | |
|---|---|---|---|---|
| 2018/0292523 | A1* | 10/2018 | Orenstein | A61B 5/1113 |
| 2021/0112647 | A1* | 4/2021 | Coleman | F21V 14/02 |
| 2021/0274139 | A1* | 9/2021 | Fuchikami | G01S 17/89 |
| 2022/0138446 | A1* | 5/2022 | Busby | G06K 19/06028<br>235/462.1 |
| 2022/0355482 | A1* | 11/2022 | Denenberg | G01V 8/00 |

FOREIGN PATENT DOCUMENTS

| | | | |
|---|---|---|---|
| EP | 3470879 | A1 | 4/2019 |
| EP | 3587894 | A1 | 1/2020 |
| EP | 3709106 | A1 | 9/2020 |

* cited by examiner

SAFE OBJECT TRACKING OF AN OBJECT

The invention relates to a monitoring device and to a method for a safe object tracking of an object.

Optoelectronic sensors are very frequently used in contactless monitoring for safeguarding hazards, for instance machines in an industrial environment or vehicles in logistics applications. A laser scanner and a camera, and in particular a 3D camera, can primarily be named here particularly for more complex applications.

In a laser scanner, a light beam generated by a laser periodically sweeps over a monitored zone with the help of a deflection unit. The light is remitted at objects in the monitored zone and is evaluated in the laser scanner. A conclusion is drawn on the angular location of the object from the angular position of the deflection unit and additionally on the distance of the object from the laser scanner from the time of flight while using the speed of light. The location of an object in the monitored zone is detected in two-dimensional polar coordinates using the angular data and the distance data. The third spatial coordinate can also still be detected by a relative movement in the transverse direction, for example by a further degree of freedom of movement of the deflection unit in the laser scanner or in that the object is moved relative to the laser scanner.

A 3D camera measures a distance and thereby acquires depth information. The detected three-dimensional image data having spacing values or distance values for the individual pixels are also called a 3D image, a distance image, or a depth map. There are 3D cameras in different technologies, including a time of flight process, a stereoscopic process, and a projection process or plenoptic cameras. A scene is illuminated by amplitude-modulated light in a time of flight (TOF) camera looked at in somewhat more detail The light returning from the scene is received and is demodulated using the same frequency that is also used for the modulation of the transmitted light (lock-in process). A measured amplitude value results from the demodulation that corresponds to a sampling value of the received signal. At least two sampling values are required for the phase determination of a periodic signal in accordance with the Nyquist criterion. The measurement is therefore carried out using different relative phasings between the signals for the modulation at the transmission side and the demodulation at the reception side. The absolute phase shift between the transmitted signal and the received signal can thus be determined that is caused by the time of flight and this is in turn proportional to the object spacing in the scene.

In the application for accident avoidance, a protected field is monitored which may not be entered by operators during the operation of the machine. If the sensor recognizes an unauthorized protected field intrusion, for instance a leg of an operator, the machine is switched into a safe state. Sensors used in safety technology have to work particularly reliably and must therefore satisfy high safety demands, for example the EN13849 standard for safety of machinery and the machinery standard EN61496 for electrosensitive protective equipment (ESPE). To satisfy these safety standards, a series of measures have to be taken such as a safe electronic evaluation by redundant, diverse electronics or different functional monitoring processes, especially the monitoring of the contamination of optical components, including a front screen.

A safety laser scanner or a safety camera that satisfies these standards and is configured for a protected field evaluation works internally with very large amounts of information of the scan point clouds or depth maps. However, only highly dense binary information is safely provided externally, namely whether the protected field has been infringed or not. For this purpose, a safe output (OSSD, output signal switching device) is typically used. More complex safe evaluations such as a position determination of an object or an object tracking are conventionally not available.

There have admittedly long been algorithms for an object tracking with an optical detection that are based on classical image processing, Kalman filters, or also increasingly artificial intelligence. However, this is not accessible to a technical safety use due to the complexity and also the lack of suitable sensors and control components. For even if it would be possible to strengthen an algorithm by corresponding safety measures such that it would satisfy the safety standards, the scan or image data required for this purpose cannot even be safely accessed in a safety laser scanner or a safety camera. As already described, there is externally only one interface for a bit of safe information on a protected field infringement. The internal computing sources of the sensor or those of a safety controller are also by no means sufficient to implement an object tracking using one of the known procedures.

Safety laser scanners and safety cameras have become known in recent times that simultaneously evaluate a plurality of protected fields. However, the simultaneous evaluation is very computing intensive and only an extremely limited number of parallel protected fields is provided. However, only the externally available safe information is thus ultimately increased from one bit to a plurality of bits. More than some few position classes corresponding to the zones fixed by the respective protected field are thereby not distinguishable and this is only sufficient for an object tracking in special cases. This number may increase in future unit generations, but this does not produce position accuracies that would be comparable with an evaluation of scan point clouds or images and therefore does not change anything about the basic limitation of an object tracking with existing algorithms.

EP 3 470 879 A1 configures at least partially mutually overlapping monitored fields in a laser scanner. Monitored segments are thereby produced that differ from one another by which monitored fields overlap there. The number of monitored fields provided at the hardware side is thus refined to the monitored segments. With a skillful configuration, $2^n$ or even a little more monitored segments are produced from n monitored fields. However, this still does not achieve any particularly fine resolution as long as n remains restricted to very small values on the hardware side and the configuration effort would very soon become prohibitive for a larger n.

EP 3 709 106 A1 proposes a safety system that validates complex, unsafe evaluations by less complex safe evaluations. In an embodiment, objects are, on the one hand, localized in an unsafe manner using scan point clouds. On the other hand, there is a grid of protected fields. The unsafely determined fine position is validated by the safe grid position. As already mentioned, the scan point cloud of a safety laser scanner can, however, not be read at all in reality; nor is there an unsafe interface for this purpose so that new units are required for this. In addition, a safe position is restricted in the narrower sense to the grid of protected fields that has to remain coarse due to the small number of possible protected fields.

Completely independently of the previously discussed technologies, rotary encoders or incremental encoders are known that are made up of two mutually movable parts. A scan unit is connected to the one part and a standard to the second part. The standard has code tracks and the scan unit generates scan signals by scanning the code tracks. A conclusion can be drawn from the scan signals on the respective position of the two parts with respect to one another.

It is therefore the object of the invention to expand the safe functionality of a monitoring device usable in safety engineering.

This object is satisfied by a monitoring device and by a method for a safe object tracking of an object in accordance with the respective independent claim. The monitoring device has at least a first safe optoelectronic sensor and a safety controller connected to it. Safety controller means a safe evaluation unit that is implemented on any desired hardware, in particular a safety controller as a controller permitted for safety applications in a narrower sense. Safe and safety mean, as in the total description, that measures are taken to control errors up to a specific safety level or to observe regulations of a relevant safety standard for machine safety or for electrosensitive protective equipment, of which some have been named in the introduction. However, this does not necessarily mean that the monitoring device is used in a safety application even though it could be. It is conceivable, for example, that a specifically carried out configuration does not provide any safety satisfying the standard or that the application is only directed to observation or, for example, safeguarding in the sense of safeguarding against theft, not protection from risks of injury. Non-safe is the opposite of safe and accordingly said demands on failsafeness are not satisfied for non-safe devices, transmission paths, evaluations, and the like.

The first safe optoelectronic sensor comprises a light receiver that generates a received signal from received light from the monitored zone. Depending on the sensor, the received signal is, for example, the signal of a photodiode that receives a returning scan beam or image data of an image sensor are called a received signal in generalized terms. The sensor furthermore has at least two safe outputs, in particular OSSDs, at which a respective preferably binary safe output signal can be output. The two safe outputs are preferably separate physical connectors, but can also be implemented as bits or the like of a more complex safety output. A first control and evaluation unit of the first sensor is configured for a protected field monitoring with at least two protected fields, a first protected field or protected field A and a second protected field or protected field B. The protected fields are each per se configurable partial zones of the monitored zone per se and bear the historically derived name of a protected field even though they may be a three-dimensional spatial zone in reality depending on the first sensor. An object intrusion into the first protected field results in a safe output signal at the first safe output and correspondingly an object intrusion into the second protected field results in a safe output signal at the second safe output. The association will at times be expressed in the following in that the safe outputs are called OSSD A and OSSD B by way of example. OSSD A and B are preferably at an object in the associated protected field A or B in the ON state and are otherwise in the OFF state. The safety controller is configured to evaluate the safe output signals.

The invention starts from the basic idea of dividing the two protected fields into mutually separate partial protected fields and thus to obtain a finer spatial resolution. This initially only relates to one dimension, but can be expanded in embodiments still to be described to two and, if required, even to three dimensions. The first and second protected fields are each configured as a plurality of partial protected fields and the partial protected fields are set up in a row along a first line and indeed such that the partial protected fields are so-to-say meshed with one another, that is first partial protected fields of the first protected field alternate with second partial protected fields of the second protected field. There can in this respect be respective gaps and/or an overlap or not. The partial protected fields belonging to the same protected field are thus preferably not contiguous. The sequence is preferably alternating, i.e. if the first line is followed, the two protected fields are infringed according to the pattern . . . ABABABA . . . . As will still have to be described, the protected fields form a kind of code tracks and in this respect more complex code patterns are conceivable, with . . . ABBABAAB . . . only being one of innumerable further examples. It is furthermore conceivable to add at least one further protected field C, D . . . and thus to form more powerful codes. This is all known per se, for example from rotary encoders, and is therefore not described in detail here, but rather for the simple representative example . . . ABABABA . . . . The first line can be curved or preferably straight; in accordance with the invention, a partial protected field corresponds to a discrete coordinate along the line, with the granularity being able to be a little finer by switching over protected fields, as explained below.

It must be emphasized that in accordance with the invention by no means only a number of position corresponding to the number of protected fields or OSSDs can be distinguished, as in the conventional solutions discussed in the introduction. In accordance with the invention, protected fields are freely configurable with in each case in principle as many mutually separated partial protected fields of any desired shape and as many small protected fields of any desired shape as desired as part of the resolving power of the first sensor. Unlike a separate protected field, partial protected fields of the same protected field are dependent on one another. An infringement is only reported in common to the corresponding safe output; the first sensor thus initially does not deliver any information as to the partial protected field of the respective protected field in which an object intrusion has taken place. However, the invention makes it possible to find this out by the special configuration of the at least two protected fields.

The invention has the advantage that a discrete safe object tracking can be implemented in one direction of movement, later also in a plurality of directions of movement with a considerably higher resolution that is not tightly linked to the extremely small number of simultaneously monitored protected fields, but rather manages with two protected fields per direction of movement. This utilizes the high design freedom in the configuration of the geometry of a protected field. A new safety function is thus opened up. It is based on the already safe protected field evaluation and on the likewise safe outputs and in a certain sense thus inherits the functional safety largely without any additional effort. The safe discrete object tracking can be used as a plausibilization or validation of a still finer unsafe object tracking function, for example with the concept of EP 3 709 106 A1 discussed in the introduction. The grid for the validation is there substantially finer due to the invention so that remaining possible errors of the unsafe object tracking function are given a much lower upper barrier.

The safety controller is preferably configured to evaluate a time sequence of the safe output signals at the first safe output and at the second safe output to determine a position of the object along the first line. Which of the partial protected fields has been infringed can be deduced from the time sequence and a position in the resolution of the partial protected fields thus results, not only of the protected fields.

The first partial protected fields preferably form a first code track and the second partial protected fields form a second code track. An analogy to incremental encoders should thus be illustrated. The partial protected fields and the gaps therebetween encode for one and zero and the scanning of this special code track takes place in that a moving object enters a partial protected field and exits it again and the associated safe output correspondingly changes its states.

The first partial protected fields and the second partial protected fields preferably overlap one another partially, in particular by half, in the direction of the first line. The infringement sequence . . . A AB B . . . thus results when an object follows the first line. A respective free zone without a partial protected field is preferably arranged along the first line between the partial protected fields. This produces infringement sequences . . . A(blank)B(blank)A . . . or . . . AB(blank)AB . . . . The overlap and the free zone are preferably accumulated, with an infringement sequence such as . . . A AB B (blank) A AB . . . . The free zone can be as large as a partial protected field and/or their mutual overlap. Another preferred extent of the free zone is measured by whether a person fits without triggering a protected field and this produces an order of magnitude of 50 cm-1 m, in particular 60 cm, corresponding to the horizontal extent of a standing person. The overlap zone can be as large as the free zone, but the actual demand here is only that both overlapping protected fields are reliably triggered when entering the overlap zone. A smaller extent of, for example, 20 cm is sufficient for this.

The safety controller is preferably configured to evaluate the time sequence of the safe output signals using an incremental encoder process for the evaluation of the scan signals of two mutually offset code tracks of a standard. The analogy with an incremental encoder is not only an illustration, the safe output signals have the same course as scan signals of an incremental encoder. The total powerful arsenal of encodings and evaluations is thus available that has been developed for incremental encoders so that it is known per se and can be used in accordance with the invention without explaining it in detail here.

The safety controller is preferably configured to determine a direction of the movement of the object from the time sequence of the safe output signals. This works particularly reliably with the above-named arrangement of partial protected fields with a mutual overlap and free space. If the safe output signals display . . . A AB B (blank) . . . , the object has moved forward; correspondingly backward with B AB A.

The safety controller preferably has a counter that is counted up and down corresponding to the direction of the movement on an entry into a partial protected field and an exit from a partial protected field. The position can be detected incrementally using a counter with knowledge of the respective direction. It is conceivable to detect intrusions into a certain protected field in separate counters, but a single counter that does not distinguish which procedure is affected is also sufficient. It could anyway be calculated backward from the count. The real position on the first line can be calculated from the count with knowledge of the protected field geometry.

The safety controller is preferably configured to only process a safe output signal at one of the safe outputs as a new safe signal when a safe output signal has in the meantime been applied to the other safe output. An example is specifically named here how a procedure developed for incremental encoders can be advantageously transferred to the invention. Incremental encoders namely tend toward bouncing. The term originally comes from a switch or button that triggers multiple times shortly after one another due to a malfunction. A comparative case can occur when an object is located at a protected field border. Said measure serves a debouncing. A largely stationary object at the protected field border namely always only again triggers a further infringement of the same protected field on a bouncing while a moving object inevitably has to infringe the other protected field.

The partial protected fields preferably have the same shape and/or size as each other. This so-to-say produces uniform code elements that considerably facilitate both the configuration and the evaluation and substantially reduce their error susceptibility. For the same reasons, the partial protected fields preferably have a simple shape and are, for example, rectangular or parallelepiped-shaped. This requirement is not necessary for the functional principle.

The safety controller is preferably configured to displace the protected fields along the first line as soon as a safe output signal is applied to one of the safe outputs. The partial protected fields thus so-to-say track the object that passes through the displaced protected field border over and over again in the course of its movement. The displacement preferably takes place by a fraction of the distance between two partial protected fields. A configuration with partial protected fields and distances of the same size corresponding to the extent of the partial protected fields . . . A(blank)B (blank) . . . is preferably provided. The displacement preferably takes place by a switchover to an offset arrangement of the protected fields. Said preferred configuration can be achieved with four switchable protected field sets. The displacements are preferably counted to thus incrementally determine the position.

The safety controller is preferably configured to displace the protected fields along the first line in the one direction with a safe output signal at the first safe output and in the other direction with a safe output signal at the second safe output. The first protected field then serves for the recognition of a forward movement and the second protected field for the recognition of a backward movement along the first line. A counter is counted up or down depending on the direction of movement.

The first safe optoelectronic sensor is preferably a 3D camera, in particular a time of flight camera. A large monitored zone can thus be detected and the configuration of protected fields and partial protected fields is possible in a fine grid. The 3D camera that is originally only configured for a protected field evaluation is provided with the additional function of a safe object tracking by the invention. The first safe optoelectronic sensor can alternatively be a laser scanner, but this requires a suitable perspective.

The safety controller is preferably configured to trigger a safeguarding of a machine monitored by the monitoring device when the object is at a hazardous position and/or in a hazardous movement. The assessment whether an object position or movement is hazardous can take place in a downstream computing unit that is here associated with the safety controller for simplicity of terminology. A hazardous position can be too close to a machine or to a machine part with possible time dependencies or the taking into account of work routines of the machine. Movements enable additional assessments since a movement in parallel with the machine, for example, or even with a partial component away therefrom is less critical than directly toward the machine. The speed can also play a role (speed and separation monitoring). The safeguarding can comprise an evasion, deceleration, or stopping of the machine or the adopting of another safe state.

The monitoring device preferably has a second optoelectronic sensor having a second light receiver, at least one third safe output, and a fourth safe output, as well as a second control and evaluation unit that is configured for a protected field monitoring of at least one third protected field having a plurality of third partial protected fields and of a fourth protected field having a plurality of fourth partial protected fields with the output of a safe output signal at the third safe output or at the fourth safe output on an object intrusion, with the third partial protected fields and fourth partial protected fields being arranged alternatingly following one another along a second line transversely to the first line, and with the safety controller in particular being configured to evaluate a time sequence of the safe output signals at the third safe output and at the fourth safe output to determine a position of the object along the second line. The second optoelectronic sensor is therefore likewise able to divide two protected fields into partial protected fields and to monitor them and to provide corresponding safe output signals. It thus corresponds to the first optoelectronic sensor, at least with respect to the features key to the invention and is preferably the same in function or even design. The two sensors monitor partial protected fields that are arranged in rows on lines oriented transversely to one another. An object tracking is thereby made possible in two dimensions. The second line, like the first line, is preferably oriented as straight and even more preferably as perpendicular to the first line. This then produces Cartesian coordinates. At least one line can be curved, form which then correspondingly distorted coordinates result that are transformable into Cartesian coordinates at any time with knowledge of the protected field geometry. An expansion of the object tracking into the third dimension is possible by adding a third optoelectronic sensor having a fifth and sixth protected field having partial protected fields along a third line transversely to the two other lines.

The first control and evaluation unit is preferably configured to switch the protected field monitoring to a third protected field having a plurality of third partial protected fields and a fourth protected field having a plurality of fourth partial protected fields, with the third partial protected fields and fourth partial protected fields being arranged alternatingly following one another along a second line transversely to the first line, and with the safety controller in particular being configured to evaluate a time sequence of the safe output signals to determine a position of the object along the second line. Infringements of the third and fourth protected fields preferably result in a corresponding safe output signal at the first or second safe output. The switchover preferably takes place very fast (toggling) and in particular faster than a response time of the protected fields required from the safety concept so that all the protected fields are effectively simultaneously monitored. This is an alternative to the embodiment of the previous paragraph that emulates the second safe optoelectronic sensor by the switchover so that only one sensor is required.

The method in accordance with the invention can be further developed in a similar manner and shows similar advantages in so doing. Such advantageous features are described in an exemplary, but not exclusive manner in the subordinate claims dependent on the independent claims.

Figure 2:
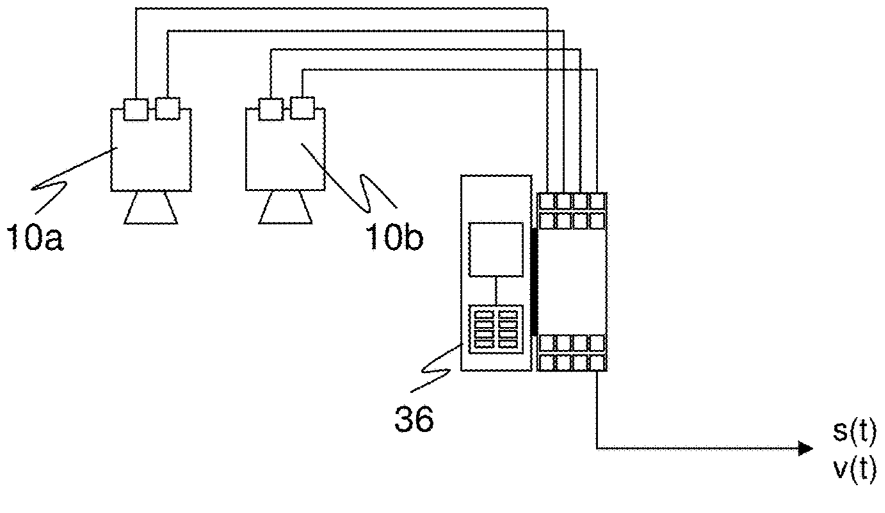
Figure 3:
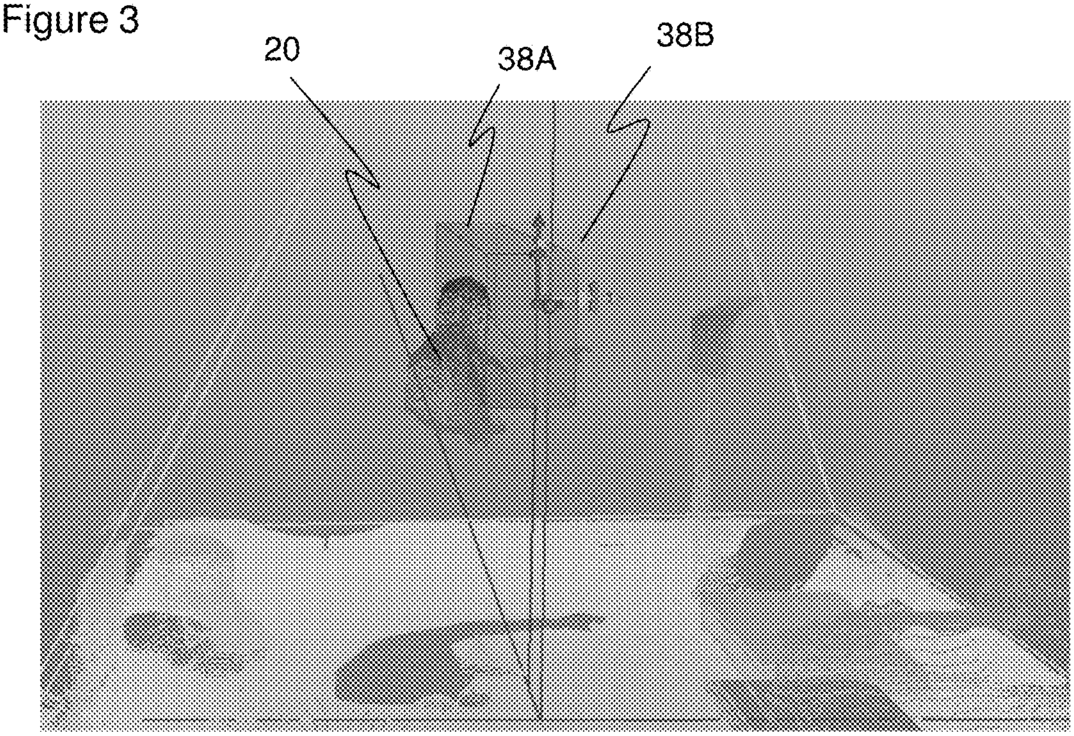
Figure 4A:
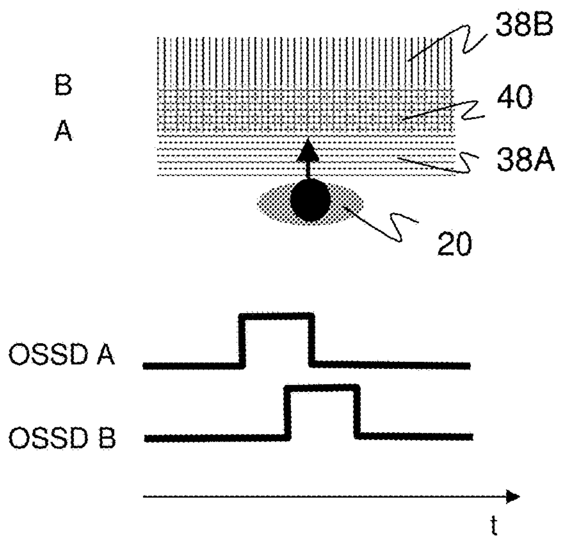
Figure 4B:
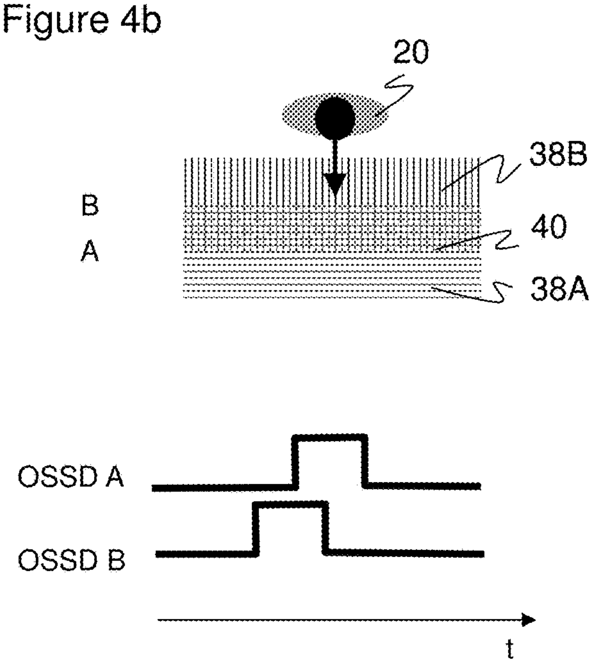
Figure 5:
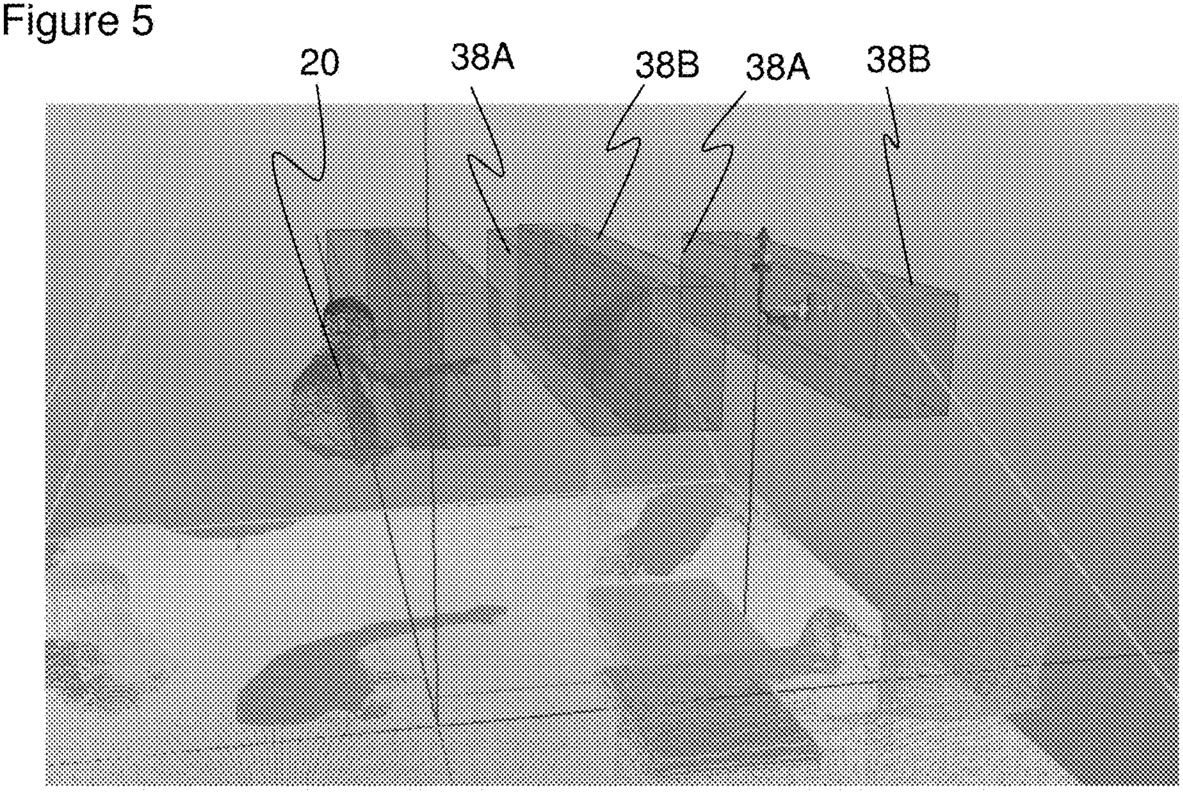
Figure 6:
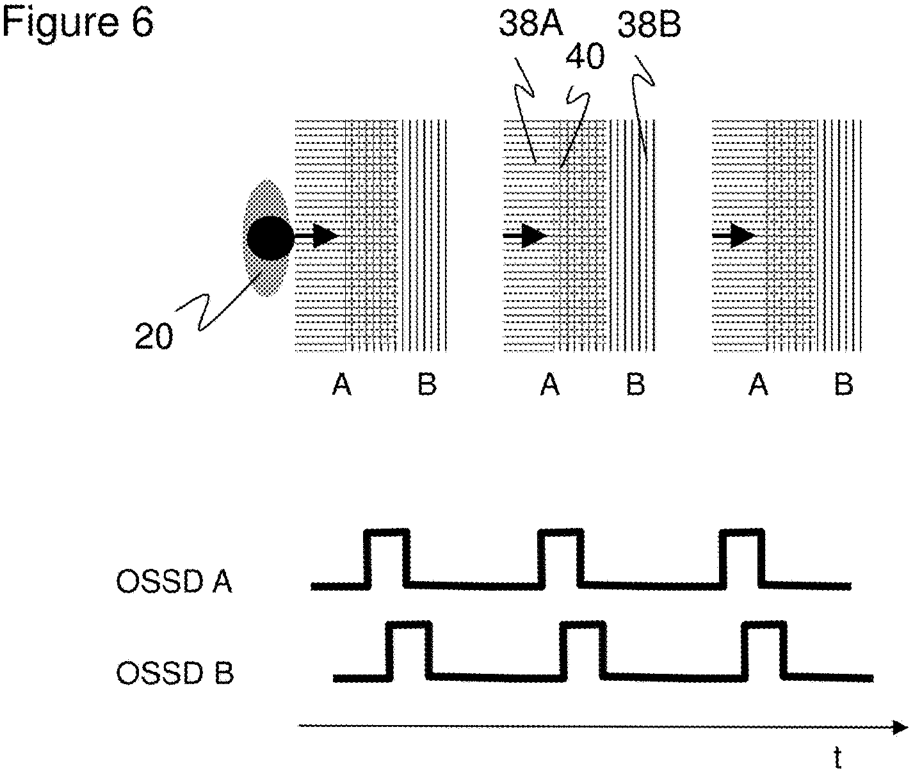
Figure 7:
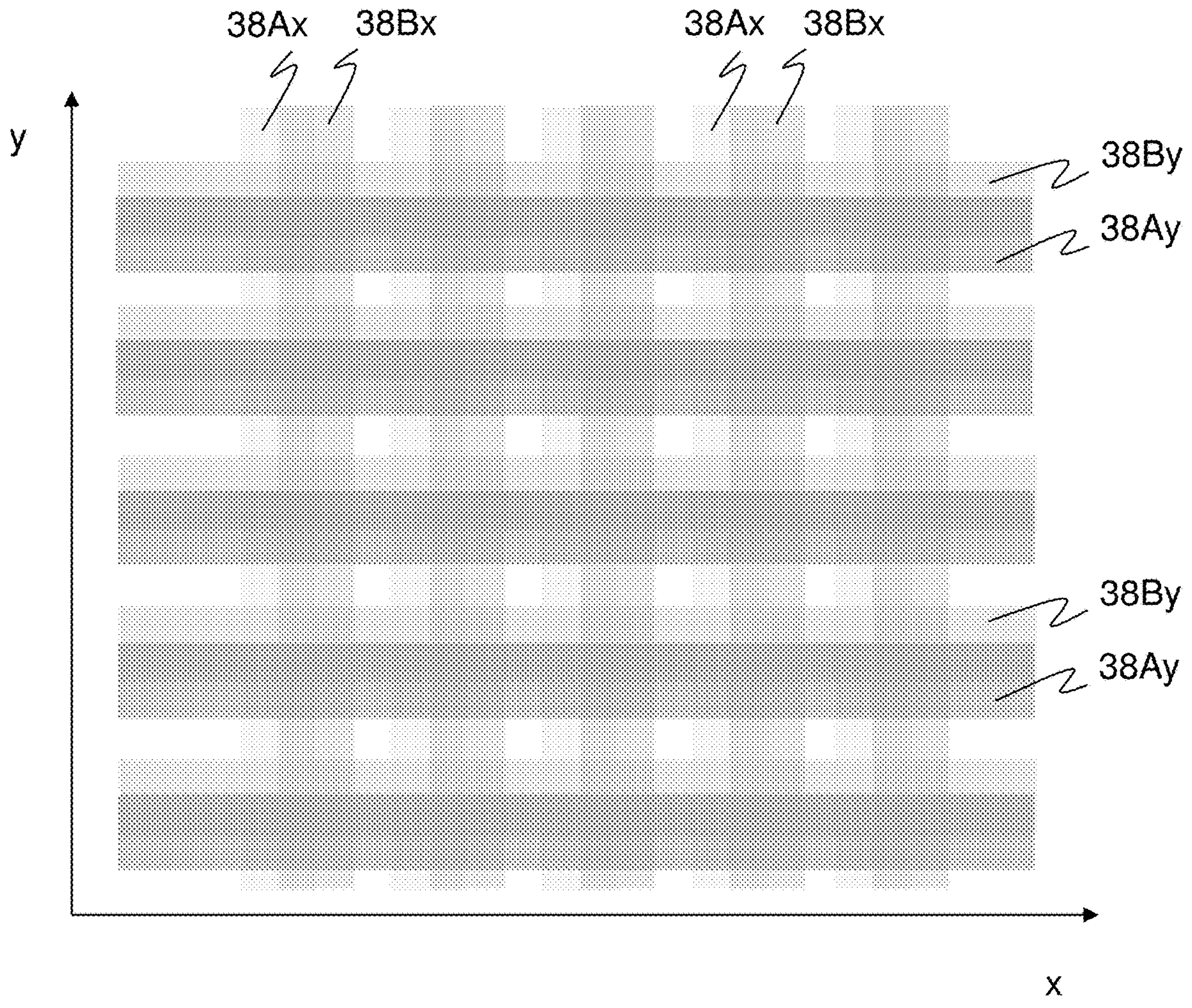
Figure 8:
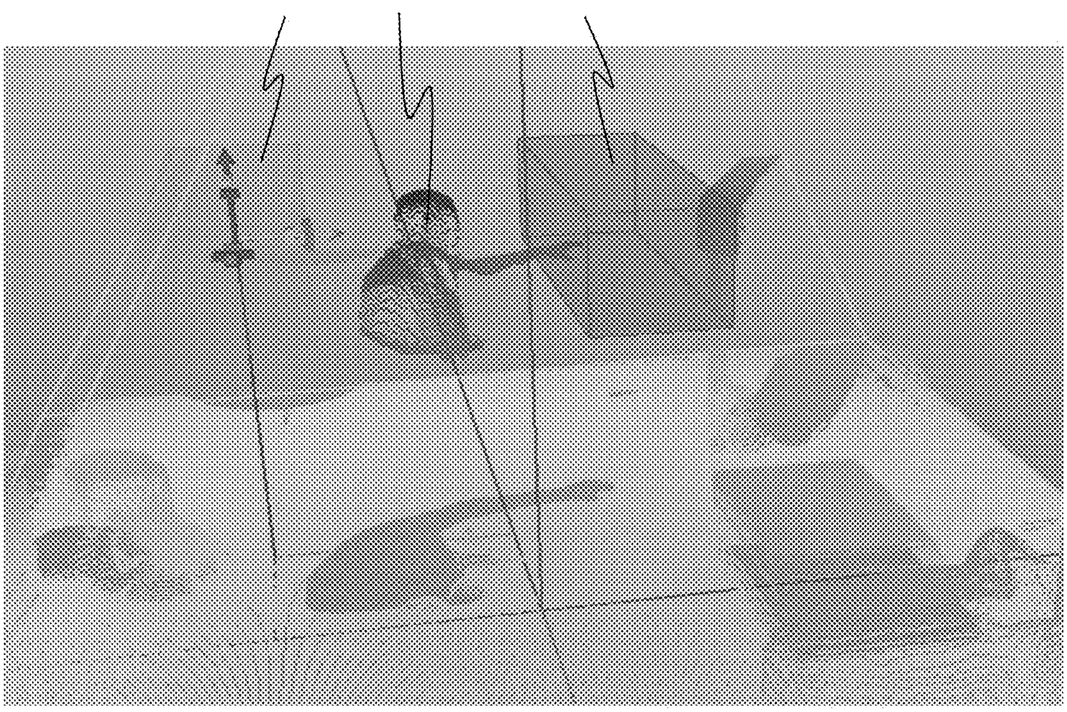
Figure 9:
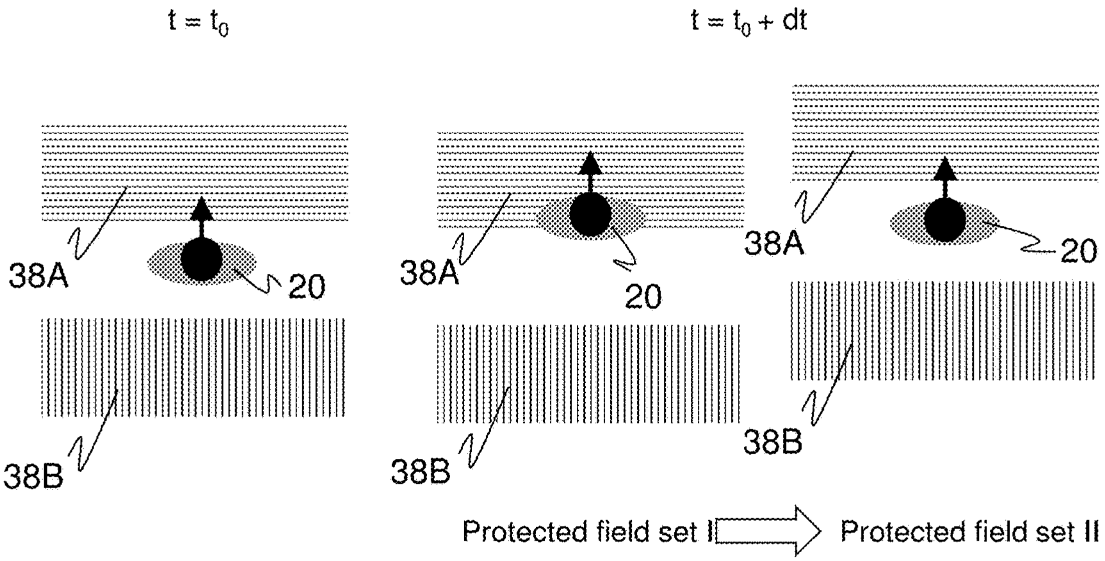
Figure 10:
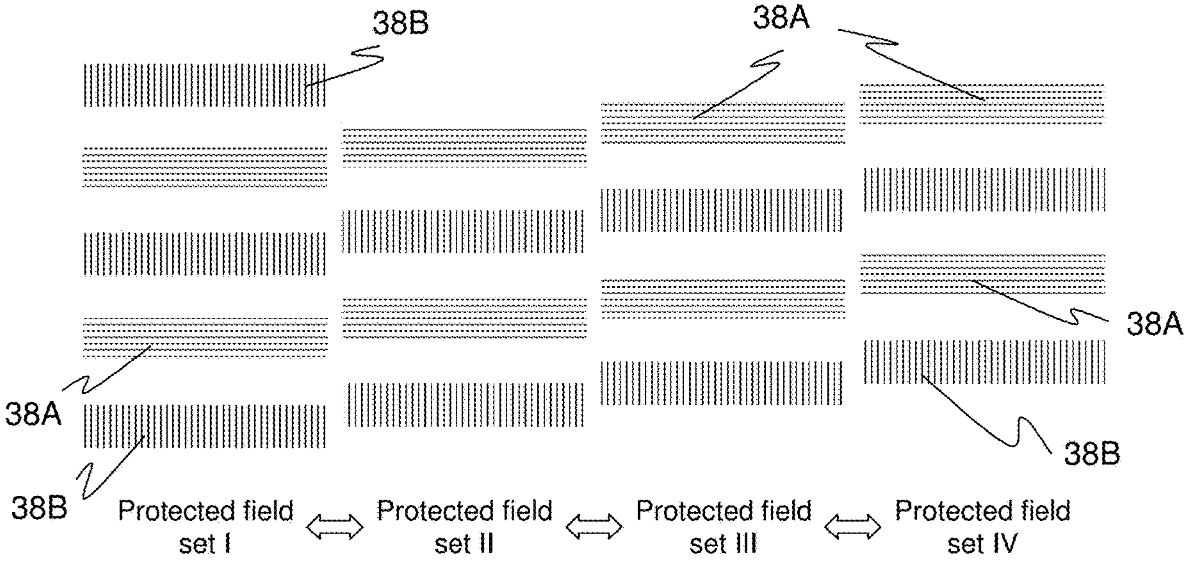

The invention will be explained in more detail in the following also with respect to further features and advantages by way of example with reference to embodiments and to the enclosed drawing. The Figures of the drawing show in:

FIG. 1 a schematic block diagram of a 3D time of flight camera;

FIG. 2 a schematic representation of a monitoring device having two cameras and a safety controller;

FIG. 3 an exemplary depth map with two protected fields;

FIG. 4*a* an alternative representation of the protected fields of FIG. 3 and, in the lower part, a signal progression at associated safe outputs during an object movement through the protected fields;

FIG. 4*b* a representation in accordance with FIG. 4*a* on an object movement in the reverse direction;

FIG. 5 an exemplary depth map similar to FIG. 3, now with a plurality of partial protected fields;

FIG. 6 an alternative representation of the protected fields of FIG. 5 and, in the lower part, a signal progression at associated safe outputs during an object movement through the protected fields;

FIG. 7 a schematic representation of two pairs of protected fields arranged crossed over one another for an object tracking, now in two dimensions;

FIG. 8 an exemplary depth map with protected fields that are displaced in a further embodiment;

FIG. 9 an alternative representation of the protected fields of FIG. 8 with an illustration of the switchover of protected fields on a protected field intrusion by a moving object; and FIG. 10 a schematic representation of four protected field sets between which there is a cyclic switchover on an object movement.

FIG. 1 shows a schematic block diagram of a camera 10 that is preferably configured as a 3D time of flight camera and that will be described as representative for an optoelectronic sensor that can be used in connection with the invention. An illumination unit 12 transmits transmitted light 16 modulated by a transmission optics 14 into a monitored zone 18. LEDs or lasers in the form of edge emitters or VCSELs can be considered as the light source. The illumination unit 12 is controllable such that the amplitude of the transmitted limit 16 is modulated at a frequency typically in the range of 1 MHz to 1000 MHz The modulation is, for example, sinusoidal or rectangular, at least a periodic modulation. A limited unambiguity range of the distance measurement is produced by the frequency so that no modulation frequencies are required for large ranges of the camera 10. Alternatively, measurements are carried out at two to three or more modulation frequencies to increase the unambiguity range in a combination of measurements.

When the transmitted light 16 is incident on an object or a person 20 in the monitored zone 18, a portion of the received light 22 is reflected back to the camera 10 and is guided there through a reception optics 24, for example a single lens or a reception objective, onto an image sensor 26. The image sensor 26 has a plurality of reception elements or reception pixels 26*a* arranged to form a matrix or a row, for example. The resolution of the image sensor 26 can extend from two or some few up to thousands or millions of reception pixels 26*a*. A demodulation corresponding to a lock-in process takes place therein. A plurality of sampling values from which ultimately the phase shift between the transmitted light 16 and the received light 22, and thus the time of flight, can be measured are generated by repeated detection with a modulation of the transmitted light 16 respectively slightly displaced over the repetitions. The pixel arrangement is typically a matrix so that a lateral spatial resolution results in an X direction and in a Y direction, which is supplemented by the Z direction of the distance measurement to form the three-dimensional image data. This 3D detection is preferably meant when a 3D camera, a 3D time of flight camera, or three-dimensional image data are spoken of. In principle, however, different pixel arrangements are also conceivable; for instance, a pixel row that is selected in a matrix or that forms the whole image sensor of a line scan camera.

At least two protected fields are configured in a control and evaluation unit 28 having at least one digital computing module such as a microprocessor or the like. They are geometrical specifications for a partial zone of the monitored zone 18 that are configured or are fed in via an interface 30, for example in a CAD program or in any other manner by means of the control and evaluation unit 28. The protected fields are monitored for object intrusions and, on a protected field infringement, a safe output signal is output at a safe output 32, 34 associated with the protected field. The status of the safe output accordingly binarily reflects the presence or absence of an object in the associated protected field. The two protected fields, fields are called protected fields A and B in the following; the associated safe output 32, 34 accordingly OSSD A and OSSD B. The camera 10 and in particular the protected field evaluation together with the output signals or OSSD states are safe in the sense defined in the introduction.

FIG. 2 shows a schematic representation of a monitoring device having two cameras 10*a*-*b* and a safety controller 36 that can be used, for example, at a crossing or in connection with the control of a robot. In an alternative embodiment, only one camera is provided, with other optoelectronic sensors also being possible, in particular a laser scanner. The evaluation of the OSSD states now to be described takes place in a safety controller 36, with this first generally to be understood as a safe evaluation of a computing unit on any desired hardware and only preferably as a safety controller in the narrower sense. The safety controller 36 carries out a safe object tracking whose results are, for example, safe values for the position, optionally also the speed at a respective point in time. This can in turn be used for a hazard evaluation in a superior evaluation, not shown, that is alternatively likewise implemented in the safety controller 36. If a hazard is recognized, a safety related signal is output to a monitored machine or to a robot. The machine or robot thereupon becomes slower or diverts to worksteps that can at least not be a hazard with this recognized object movement and the machine is only switched to a safe state in case of an emergency. High availability and productivity are thus achieved overall.

A safe object tracking is an important basic function for the most varied automation applications in production and logistics, for instance when a vehicle should evade a person and not simply stop. Equally, robots should use the knowledge of the exact position of a person in the vicinity to divert to other work zones and to maintain the productive processes. Future safeguarding solutions that have an influence on the automatic processes in a larger zone up to a whole workshop or factory on a superior plane likewise require knowledge of the positions of all the persons.

FIG. 3 shows an exemplary depth map with two protected fields. Parts of the floor and the upper part of the body of a person 20 are recorded in accordance with a recording perspective from above as a 2D or 3D point cloud. Two mutually overlapping protected fields 38A-B are configured at head height. FIG. 4*a* shows an alternative representation of the protected fields 38A-B in the upper part from a plan view and a time signal progression in the lower part at the associated safe outputs 32, 34 that are called OSSD A and OSSD B during a movement of the person 20 through the protected fields 38A-B, in the following briefly protected fields A and B. FIG. 4*b* shows this on a movement of the person 20 in the reverse direction.

Protected fields A and B can be understood as code elements of a code track of an incremental encoder. An incremental encoder serves to measure a linear movement or a rotational movement in discrete steps. It uses at least two separate code tracks for this purpose having incremental code elements that each generate a binary periodic signal on a movement. The signals of both code tracks are phase shifted with respect to one another, which makes the determination of the direction of movement possible. The principle can be transmitted to a discrete object tracking using an optical sensor and a protected field monitoring. With an incremental encoder, the scan of a respective code element generates a pulse in the scan signal. Fully analogously, the movement of the person 20 through a protected field A or B generates a temporary ON state at the associated OSSD A or B that is likewise of pulse form.

As can be recognized in FIG. 4*a*, protected field A is first triggered and then shortly afterward protected field B on a movement in the one direction of movement, upward here. Two pulses are accordingly produced briefly after one another at OSSD A and OSSD B. The time behavior is reversed on a reverse direction of movement in accordance with FIG. 4*b*. The overlap delivers an additional consistency condition. There must always be an intermediate state in which both protected fields A and B are infringed and thus a pulse is simultaneously applied to both OSSDs A and B. Only the direction of movement of the penetration of this pair of protected fields A and B can initially be determined by the constellation of FIGS. 3 and 4*a*-*b*. Since the protected field evaluation is safe, the information as to the side of protected fields A, B on which the person 20 is located is safely available. The constellation of FIGS. 3, 4*a*-*b*, however, also corresponds to only one single code element or increment of an incremental encoder.

FIG. 5 shows an exemplary depth map similar to FIG. 3, but now with a plurality of partial protected fields. The fact that the protected fields 38A-B can be configured almost as desired is thus utilized. In the sense of the protected field evaluation, there are still only the two protected fields A and B. However, each of the protected fields A and B is now divided into a plurality of non-contiguous partial protected fields, with the partial protected fields being arranged in a row alternatingly along a line. An object tracking or movement tracking along the line and thus in a dimension is thus made possible. In a further embodiment that will be described below with reference to FIG. 7, it can be expanded to two or three dimensions.

FIG. 6 shows the protected fields A and B of FIG. 5 again from the plan view divided into partial protected fields in the upper part and a signal progression at OSSD A and OSSD B in the lower part while a person 20 moves through the protected fields in the displayed direction. The periodic continuation of the constellation of FIGS. 3, 4*a*-*b* expands individual code elements into a code track. The movement of the person 20 through the protected fields A and B and their partial protected fields generates a sequence of pulse pairs. Such a signal progression corresponds to the scan signals of an incremental encoder. It has already been explained with reference to FIG. 4*a*-*b* how each pulse pair can be evaluated to safely determine the direction of movement. The linear movement of the person 20 can be measured with the aid of a counter and the partial protected fields. On a movement in the one direction, here from left to right, for example, the counter is counted up; corresponding to a movement in the opposite direction counted down. The count can be converted into a discrete linear position using the specific protected field geometry. An initialization of the counter is unproblematic as long as persons 20 can only enter the zone of protected fields A and B either from the left or from the right and a distinction can also be made between right and left by the direction of movement. Design measures or other measures may be necessary for this purpose for the one-dimensional case so that a person 20 does not penetrate from the side. This is also dispensed with in the later two-dimensional expansion because a person 20 does not appear in the middle of the space. A protocol is only required here on the activation and release of the system so that there is initially no person 20 in or between the protected fields, but they are measures usual in safety engineering.

Since the protected field evaluation and the signals at the OSSDs are reliable in the sense of functional safety, only the simple binary counter evaluation using the specifications of functional safety have to be implemented. A safety controller 36 having a very moderate power is already sufficient for this purpose. The resulting count can be evaluated with the aid of internal logic operations and can in turn be used as a control signal for a machine. A machine or a robot can thus in particular be caused to take suitable measures that preclude a hazard up to a full deceleration or a shutdown. The safe position information or object tracking can, however, also be evaluated considerably more complexly, for example in that the suitable safety measure depends on the trajectories, possibly also speed and accelerations, of monitored persons or on the machine state.

The movement tracking in analogy with an incremental encoder has been described at a very simple constellation with regular, similar, alternating, and overlapping partial protected fields. A large number of different encodings and evaluations are known from incremental encoders. Such code tracks can be imitated with partial protected fields and the evaluation process of the incremental encoder can then be applied to the corresponding signals at the OSSDs. This in particular relates to the robustness of the evaluation. Let a debouncing of the switchover be named as an example. On a bouncing, the person 20 is located at a protected field border and repeatedly triggers the protected field by small movements. A possibility of debouncing comprises requiring a protected field intrusion into the protected field B having to take place after a protected field intrusion into protected field A, and vice versa, otherwise the protected field intrusion is ignored. However, incremental encoders also know more complex processes for debouncing.

FIG. 7 shows a schematic representation of two pairs of protected fields 38Ax, 38Bx, 38Ay, 38By arranged crossed over one another for an object tracking, now in two dimensions. The previously explained protected field configuration is thus doubled with a pair of protected fields 38Ax, 38Bx being responsible for the one direction of movement or dimension and the other pair of protected fields 38Ay, 38By being responsible for the other direction of movement or dimension. In addition, the respective width is preferably adapted so that the planar zone is covered by the produced grid of partial protected fields.

The movement tracking runs as described in one direction, that is X or Y. Only two counters, a respective one per direction or dimension, now have to track the positions along their respective direction by counting up or down. The orientation of the two protected field pairs 38Ax, 38Bx, 38Ay, 38By is preferably perpendicular to one another; however, slanted coordinates could be treated very analogously with knowledge of the protected field geometry. This also applies in another respect to curved partial protected fields or curved lines along which they are arranged in rows; a corresponding coordinate transformation into Cartesian coordinates is then possible with knowledge of the protected field geometry.

The additional protected field pair can thereby be monitored in that a second sensor is used for this purpose as has already been shown in FIG. 2. Alternatively, there is only a single sensor that switches its protected fields over fast in time between the configurations for a respective direction (toggling). It must be noted that difficulties can arise when more than one person is present in the zone covered by the protected fields. No unambiguous assignment of a protected field intrusion to one of the persons is possible with the few protected fields, four in the embodiment. However, signal progressions will then arise very fast at the OSSDs that a single person could not trigger. The system is therefore admittedly not able to track a plurality of persons, but by all means to recognize the error state with a plurality of persons and to initiate a safety measure as required. This safety measure can comprise the switchover to a conventional protected field that only safeguards the actual hazard source and cannot perform a safe object tracking.

FIG. 8 shows an exemplary depth map with a person 20 and protected fields 3A-B for explanation of a further embodiment. In this embodiment, the protected fields 38A-B are synchronously switched over with the movement. FIG. 9 shows the protected fields 38A-B in a plan view again in three different stages of a movement. Only two partial protected fields are shown; this is then continued later with FIG. 10 analog to the previous procedure periodically with a plurality of such partial protected fields.

A person 20 is located between two partial protected fields of the protected fields 38A-B at the left in FIG. 9 at a time $t=t_0$. A counter for the position is in a status n. The two partial protected fields belong to different protected fields 38A-B to be able to distinguish between a forward and backward movement. In the middle of FIG. 9, the person 20 has moved forward into the partial protected field of protected field 38A at a time $t=t_0+dt$. The counter for the positions is correspondingly counted up to n+1. At the right in FIG. 9, the protected fields are thereupon switched over to a different configuration in which the partial protected fields are upwardly displaced slightly offset. The protected field infringement is thereby canceled. On a continued movement, the protected field 38A is again infringed for the forward movement, the counter is counted up to n+2, and a switchover is again made to a slightly upwardly offset protected field set. On a respective backward movement, a correspondingly reverse protected field switchover takes place with a downwardly offset protected field set and the counter for the position is counted down by one.

FIG. 10 shows a schematic representation of four protected field sets between which there is a cyclic switchover on an object movement. In these protected field sets, the extent in the monitored direction of movement is respectively the same for the partial protected fields and the gaps therebetween and the offset takes place by half of this common extent. The cycle is thereby closed after four switchovers, with optionally the roles for forward and backward, i.e. protected fields A and B, being able to be switched on the switchover between the first and last protected field sets between the first and last protected fields at the end of a cycle. The representation of FIG. 10 is exemplary; a large number of alternative protected field sets are conceivable by which a counter for the position and thus a safe object tracking can be implemented by an automatic switchover to slightly offset partial protected fields.

The alternative embodiment with a switchover to offset protected fields can be expanded analog to the explanations with respect to FIG. 7 to the multidimensional case. It has a somewhat higher implementation effort since a plurality of protected field sets have to be configured, with this being able to be considerably simplified by an at least partially automated support at least on the part of the user. The required fast time switchovers between protected field sets also results in a certain increased effort or higher demands on the hardware and the sensor.

It may be sensible to use a plurality of sensors in all the embodiments. On the one hand, a larger monitored zone 18 can be detected overall in this manner. A plurality of sensors alternatively or additionally serve for a grid resolution. The resolution of the object tracking is limited by a minimum size and a minimum distance of partial protected fields. This has technical safety reasons that permit a safe protected field evaluation in dependence on the original sensor resolution only for protected fields of a certain resolution, for example a minimum size of 30 cm and a minimum distance of 50 cm. An overall higher resolution can be achieved by protected fields slightly offset from one another. There is in turn an analogy to incremental encoders having more than two code tracks. Arrangements of the code elements and evaluations of their scan signals that can be transferred to partial protected fields and to an evaluation of associated OSSD signals and that are more robust and/or have better resolution than naïve approaches are also known from incremental encoders.

The described 3D camera 10, in particular a TOF camera, is particularly suitable for the safe object tracking in accordance with the invention. Other sensors are, however, also possible, in particular a safety laser scanner. Certain restrictions then have to be accepted, for example by conditions on the application geometry. The movement should preferably take place perpendicular to the beam direction of the safety laser scanner and by a corresponding arrangement of two-dimensional, overlapping protected fields.

The invention claimed is:

1. A monitoring device for a safe object tracking of an object in a monitored zone, comprising:

a first safe optoelectronic sensor; and a safety controller connected to the first optoelectronic sensor, wherein the first safe optoelectronic sensor has a first light receiver for generating a received signal from received light from the monitored zone, at least one first safe output, and a second safe output, wherein the at least one first safe output and the second safe output are each configured for outputting a safe output signal, the first optoelectronic sensor further having a first control and evaluation unit that is configured to monitor at least a first protected field and a second protected field in the monitored zone for object intrusions using the received light and to output a safe output signal at the at least one first safe output on an object intrusion into the first protected field and to output a safe output signal at the second safe output on an object intrusion into the second protected field, wherein the safety controller is configured to evaluate the safe output signals, wherein the first protected field has a plurality of first partial protected fields and the second protected field has a plurality of second partial protected fields, wherein the first partial protected fields and the second partial protected fields are arranged alternatingly following one another along a first line, and wherein the first partial protected fields form a first code track and the second partial protected fields form a second code track.

2. The monitoring device in accordance with claim 1, wherein the safety controller is configured to evaluate a time sequence of the safe output signals at the at least one first safe output and at the second safe output to determine a position of the object along the first line.

3. The monitoring device in accordance with claim 1, wherein the first partial protected fields and the second partial protected fields partially overlap one another in a direction of the first line.

4. The monitoring device in accordance with claim 3, wherein the first partial protected fields and the second partial protected fields partially overlap one another by half.

5. The monitoring device in accordance with claim 1, wherein a respective free zone without a partial protected field is arranged along the first line between the first and second partial protected fields.

6. The monitoring device in accordance with claim 1, wherein the safety controller is configured to evaluate a time sequence of the safe output signals using an incremental encoder process for evaluation of scan signals of two mutually offset code tracks of a standard.

7. The monitoring device in accordance with claim 1, wherein the safety controller is configured to determine a direction of movement of the object from a time sequence of the safe output signals.

8. The monitoring device in accordance with claim 7, further comprising a counter that is counted up and down corresponding to the direction of the movement on an entry into a partial protected field and a departure from a partial protected field.

9. The monitoring device in accordance with claim 8, wherein the safety controller has the counter.

10. The monitoring device in accordance with claim 1, wherein the safety controller is configured to only process a safe output signal at one of the first and second safe outputs as a new safe signal when a safe output signal has in the meantime been applied to the other one of the first and second safe outputs.

11. The monitoring device in accordance with claim 1, wherein the first and second partial protected fields have the same shape and/or size as each other.

12. The monitoring device in accordance with claim 1, wherein the safety controller is configured to displace the first and second protected fields along the first line as soon as a safe output signal is applied to one of the first and second safe outputs.

13. The monitoring device in accordance with claim 12, wherein the displacement takes place by switching over to an offset arrangement of the first and second protected fields.

14. The monitoring device in accordance with claim 12, wherein the safety controller is configured to displace the first and second protected fields along the first line in one direction with a safe output signal at the at least one first safe output and in an other direction with a safe output signal at the second safe output.

15. The monitoring device in accordance with claim 1, wherein the first safe optoelectronic sensor is a 3D camera.

16. The monitoring device in accordance with claim 15, wherein the 3D camera is a time of flight camera.

17. The monitoring device in accordance with claim 1, wherein the safety controller is configured to trigger a safeguarding of a machine monitored by the monitoring device when the object is at a hazardous position and/or in a hazardous movement.

18. The monitoring device in accordance with claim 1, further comprising a second optoelectronic sensor having a second light receiver, at least one third safe output, and a fourth safe output, the second optoelectronic sensor further comprising a second control and evaluation unit that is configured for a protected field monitoring of at least one third protected field having a plurality of third partial protected fields and of a fourth protected field having a plurality of fourth partial protected fields with the output of a safe output signal at the third safe output or at the fourth safe output on an object intrusion, and with the third partial protected fields and fourth partial protected fields being arranged alternatingly following one another along a second line transverse to the first line.

19. The monitoring device in accordance with claim 18, wherein the safety controller is configured to evaluate a time sequence of the safe output signals at the third safe output and at the fourth safe output to determine a position of the object along the second line.

20. The monitoring device in accordance with claim 1, wherein the first control and evaluation unit is configured to switch the protected field monitoring to a third protected field having a plurality of third partial protected fields and a fourth protected field having a plurality of fourth partial protected fields, and with the third partial protected fields and fourth partial protected fields being arranged alternatingly following one another along a second line transverse to the first line.

21. The monitoring device in accordance with claim 20, wherein the safety controller is configured to evaluate a time sequence of the safe output signals to determine a position of the object along the second line.

22. A method of a safe object tracking of an object in a monitored zone, comprising:

monitoring at least a first protected field and a second protected field in the monitored zone for object intrusions with a first safe optoelectronic sensor, wherein the first safe optoelectronic sensor uses using a received signal of a light receiver;

outputting a safe output signal at a first safe output of the first safe optoelectronic sensor on an object intrusion into the first protected field;

outputting a safe output signal at a second safe output of the first safe optoelectronic sensor on an object intrusion into the second protected field; and evaluating the safe output signals, wherein the first protected field has a plurality of first partial protected fields and the second protected field has a plurality of second partial protected fields, wherein the first partial protected fields and the second partial protected fields are arranged alternatingly following one another along a line, and wherein the first partial protected fields form a first code track and the second partial protected fields form a second code track.

23. A monitoring device for a safe object tracking of an object in a monitored zone, comprising:

a first safe optoelectronic sensor; and a safety controller connected to the first optoelectronic sensor, wherein the first safe optoelectronic sensor has a first light receiver for generating a received signal from received light from the monitored zone, at least one first safe output, and a second safe output, wherein the at least one first safe output and the second safe output are each configured for outputting a safe output signal, the first optoelectronic sensor further having a first control and evaluation unit that is configured to monitor at least a first protected field and a second protected field in the monitored zone for object intrusions using the received light and to output a safe output signal at the at least one first safe output on an object intrusion into the first protected field and to output a safe output signal at the second safe output on an object intrusion into the second protected field, wherein the safety controller is configured to evaluate the safe output signals, wherein the first protected field has a plurality of first partial protected fields and the second protected field has a plurality of second partial protected fields, wherein the first partial protected fields and the second partial protected fields are arranged alternatingly following one another along a first line, and wherein the first partial protected fields and the second partial protected fields partially overlap one another in a direction of the first line, wherein the first partial protected fields and the second partial protected fields partially overlap one another by half.

24. A monitoring device for a safe object tracking of an object in a monitored zone, comprising:

a first safe optoelectronic sensor; and a safety controller connected to the first optoelectronic sensor, wherein the first safe optoelectronic sensor has a first light receiver for generating a received signal from received light from the monitored zone, at least one first safe output, and a second safe output, wherein the at least one first safe output and the second safe output are each configured for outputting a safe output signal, the first optoelectronic sensor further having a first control and evaluation unit that is configured to monitor at least a first protected field and a second protected field in the monitored zone for object intrusions using the received light and to output a safe output signal at the at least one first safe output on an object intrusion into the first protected field and to output a safe output signal at the second safe output on an object intrusion into the second protected field, wherein the safety controller is configured to evaluate the safe output signals, wherein the first protected field has a plurality of first partial protected fields and the second protected field has a plurality of second partial protected fields, wherein the first partial protected fields and the second partial protected fields are arranged alternatingly following one another along a first line, wherein the safety controller is configured to determine a direction of movement of the object from a time sequence of the safe output signals, and wherein the monitoring device further comprises a counter that is counted up and down corresponding to the direction of the movement on an entry into a partial protected field and a departure from a partial protected field.

25. A monitoring device for a safe object tracking of an object in a monitored zone, comprising:

a first safe optoelectronic sensor; and a safety controller connected to the first optoelectronic sensor, wherein the first safe optoelectronic sensor has a first light receiver for generating a received signal from received light from the monitored zone, at least one first safe output, and a second safe output, wherein the at least one first safe output and the second safe output are each configured for outputting a safe output signal, the first optoelectronic sensor further having a first control and evaluation unit that is configured to monitor at least a first protected field and a second protected field in the monitored zone for object intrusions using the received light and to output a safe output signal at the at least one first safe output on an object intrusion into the first protected field and to output a safe output signal at the second safe output on an object intrusion into the second protected field, wherein the safety controller is configured to evaluate the safe output signals, wherein the first protected field has a plurality of first partial protected fields and the second protected field has a plurality of second partial protected fields, wherein the first partial protected fields and the second partial protected fields are arranged alternatingly following one another along a first line, and wherein the safety controller is configured to only process a safe output signal at one of the first and second safe outputs as a new safe signal when a safe output signal has in the meantime been applied to the other one of the first and second safe outputs.

* * * * *